March 23, 1943. J. H. MINTER 2,314,507
KILN
Filed Sept. 2, 1941 8 Sheets-Sheet 2

James H. Minter
INVENTOR
BY Victor J. Evans & Co.
ATTORNEYS

March 23, 1943.  J. H. MINTER  2,314,507
KILN
Filed Sept. 2, 1941  8 Sheets-Sheet 4

James H. Minter
INVENTOR

BY Victor J. Evans & Co.
ATTORNEYS

March 23, 1943.  J. H. MINTER  2,314,507
KILN
Filed Sept. 2, 1941   8 Sheets-Sheet 8

James H. Minter.
INVENTOR
BY Victor J. Evans & Co.
ATTORNEYS

Patented Mar. 23, 1943

2,314,507

UNITED STATES PATENT OFFICE 2,314,507

KILN

James H. Minter, Columbus, Ga.

Application September 2, 1941, Serial No. 409,304

14 Claims. (Cl. 25—142)

My invention relates to the manufacture of ceramic products, and includes among its objects and advantages the provision of an improved tunnel kiln embodying novel means for preheating or drying, burning, or baking and cooling bricks and the like.

In the accompanying drawings:

Figure 1b is a top plan view of that portion of the kiln representing the cooling zone, this figure constituting a continuation of Figure 1a;

Figure 2a is a side elevational view of the structure of Figure 1a;

Figures 1, 1A:
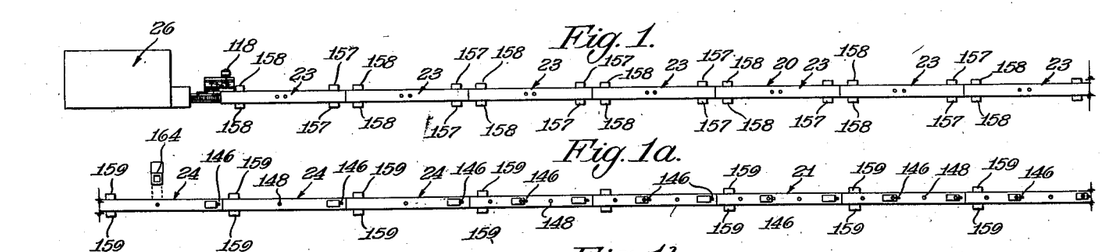
Figure 1 is a top plan view of that portion of the tunnel kiln representing the preheating or drying zone of the system.
Figure 1a is a top plan view of that portion of the kiln representing the burning or baking zone, the figure constituting a continuation of Figure 1.
Figure 1B:
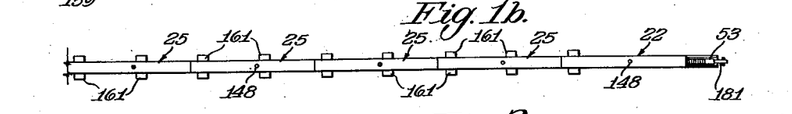
Figure 2:
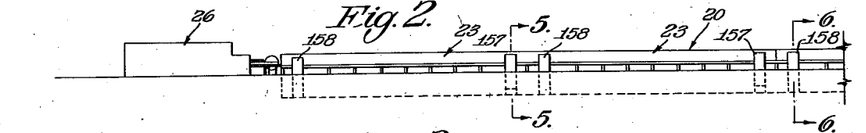
Figure 2 is a side elevational view of the structure of Figure 1.
Figure 2A:
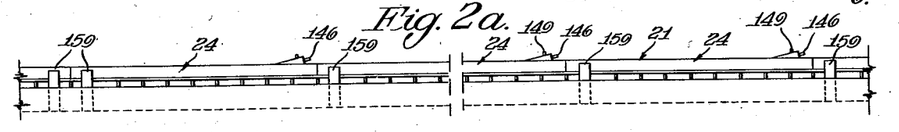
Figure 2B:
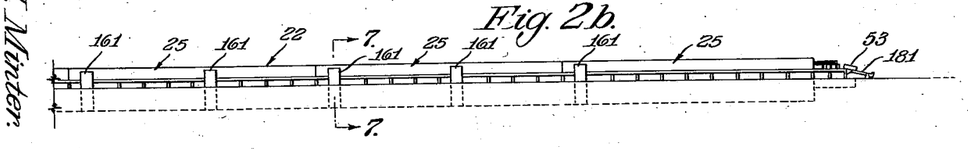
Figure 2b is a side elevational view of the structure of Figure 1b.

In the embodiment selected to illustrate my invention, Figs. 1, 1a and 1b illustrate kiln sections 20, 21 and 22 which are arranged end to end, with the section 21 constituting a continuation of section 20 and section 22 constituting a continuation of the section 21. These three sections 20, 21 and 22 respectively represent a drying zone and a cooling zone. Figs. 2, 2a and 2b respectively illustrate the sections 20, 21 and 22 in side elevation. Section 20 is made up of seven similar units 23 while section 21 is made up of eight similar units 24, and five similar units 25 make up the section 22.

The brick machine or extruder 26 is indicated generally in Figs. 1 and 2, the products of which are delivered to the section 20 and moved continuously therethrough as well as through the respective sections 21 and 22, after which the products have been dried, baked and cooled and are ready for removal to a place of storage or transportation facilities.

Figure 9:
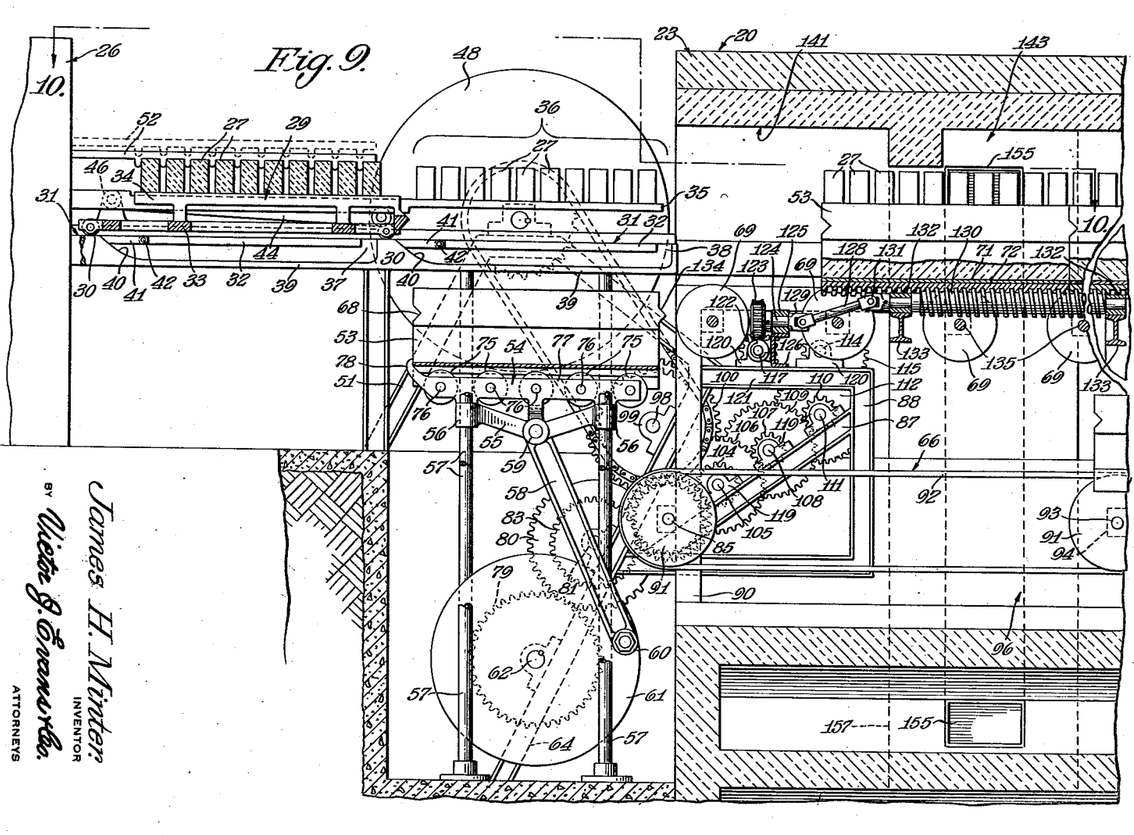
Figure 9 is an elevational view illustrating the manner in which the pallets are transferred from the return conveyor onto the pallet elevator which picks the brick off the loader ribs, certain parts being broken away for the sake of clearness.
Figures 10, 11:
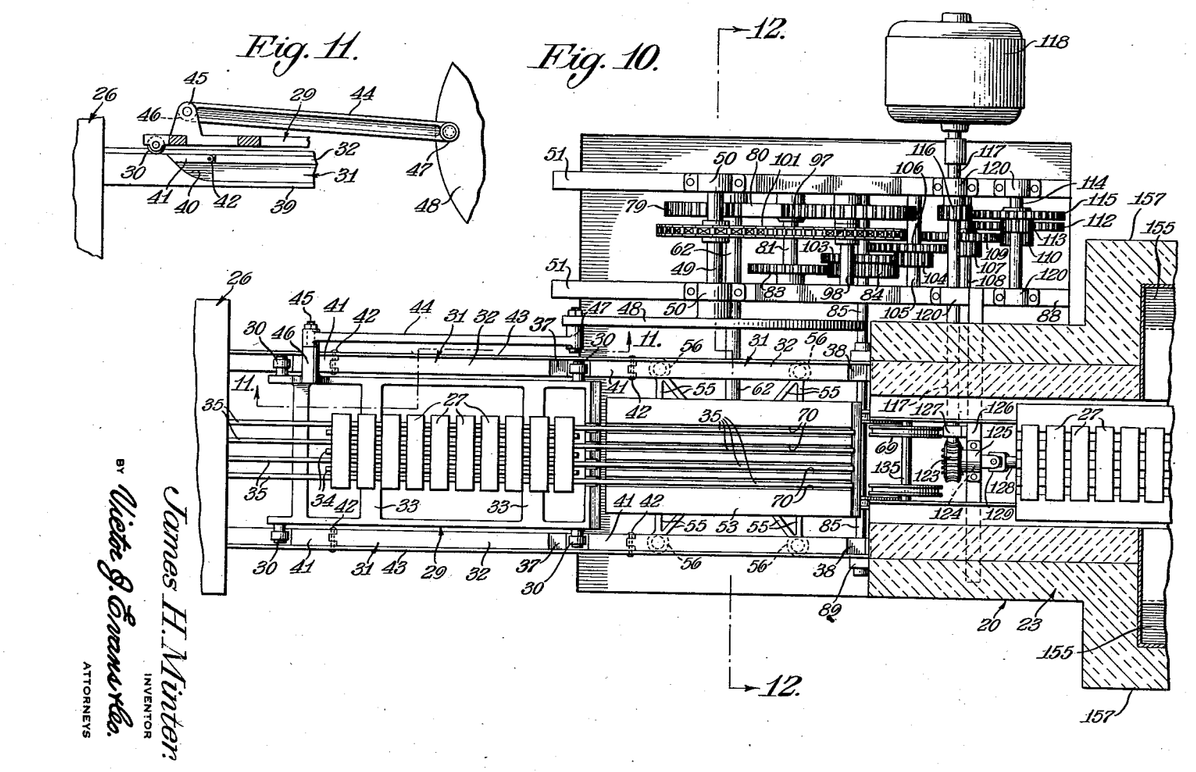
Figure 10 is a top plan view of the structure of Figure 9.
Figure 11 is a view taken from the position indicated by line 11—11 of Figure 10.

Figs. 9 and 10 illustrate a series of bricks 27 which have come from the brick machine or extruder 28 and are at rest edgewise on a carriage 29 provided with wheels 30 operating on rails 31. Rails 31 are in the nature of channels facing each other and the wheels 30, in Figs. 9 and 10, are resting on the top flanges 32 of the rails. The carriage 29 includes cross members 33 which support a series of spaced and parallel bars 34 upon which the bricks 27 rest. Fig. 10 illustrates the wheels 30 as being located laterally of the carriage 29, and the bars 34 are spaced for the reception of load supporting bars 35 extending therebetween and to points considerably in advance of the series of bricks 27 and the carriage 29, as shown in Figs. 9 and 10. Bars 35 are arranged in parallel relationship one with the other and their upper faces are spaced slightly beneath the upper faces of the bars 34 so as to clear the series of bricks 27 when the carriage is advanced to position this series of bricks in the position 36 of Fig. 9.

Transfer of the series of bricks 27 from their initial position to position 36 of Fig. 9 is accomplished through dropping of the carriage 29 after it has been advanced to its foremost position. Figs. 9 and 10 illustrate the flanges 32 of the rails 31 as being cut away at 37 and 38 to provide openings into which the wheels 30 may drop when the carriage 29 has advanced to its foremost position, at which time the series of bricks 27 is vertically aligned with the bricks in the position 36. Dropping of the carriage 29 brings the series of bricks 27 to a position of rest on the bars 35 in the position 36. After dropping through the openings 37 and 38, the wheels come to rest on the bottom flanges 39, on which the wheels roll during movement of the carriage to its rearmost position of Figs. 9 and 10.

Flanges 39 are provided with inclined track sections 40 on which the wheels ride to elevate the carriage to its normal position. Gates 41 are provided in the flanges 32 for the passage of the wheels 30. These gates are pivoted at 42 to the top flanges 32 and their free ends rest on the inclined track sections 40. Thus the gates are pivoted upwardly by the wheels 30 when climbing the inclined track sections to permit the wheels to pass through the flanges 32. At the same time the gates 41 are supported against pivotal movement when the carriage 29 is being advanced for depositing bricks on the load supporting bars 35. Guide flanges 43 are provided on the rails 31 to hold the wheels 30 in position on the rails.

Means for imparting reciprocatory motion to the carriage 29 comprises a rod 44 pivotally connected at 45 to a lug 46 fixedly secured to the carriage 29, see Figs. 10 and 11. The other end of the rod 44 is pivotally connected at 47 to a wheel 48 fixed to a shaft 49 rotatably supported by bearings 50 mounted on frames 51, see also Fig. 12. Rotation of the wheel 48 imparts reciprocatory motion to the carriage 29 by reason of the rod 44. Wheel 48 is characterized by an intermittent motion. Figs. 10 and 11 illustrate the rod 44 in one extreme position, at which time the wheel 48 has a period of rest. Rotation of the wheel 48 180° moves the carriage 29 to its other extreme position, at which time the wheel 48 also has a period of rest.

The series of brick 27 constitutes a pallet load, and the bricks in the series are spaced by a suitable spacing device 52 which is moved clear of the brick prior to advancement thereof. Fig. 9 illustrates a refractory pallet 53 supported on an elevator 54 located underneath the rails 31. This elevator includes a frame 55 provided with four tubular guides 56 through which vertical posts 57 extend. These posts afford support for the forward ends of the rails 31, these rails being also supported by the extruding machine 26.

The successive series of brick delivered to the position 36 are dropped in exactly the same position on the load supporting bars 35, and the elevator 54 is reciprocated vertically in a definite path by reason of the posts 57 so that the bricks in the position 36 are perfectly aligned with the pallet 53 as it is elevated for lifting the brick off the load supporting bars 35.

Figure 12:
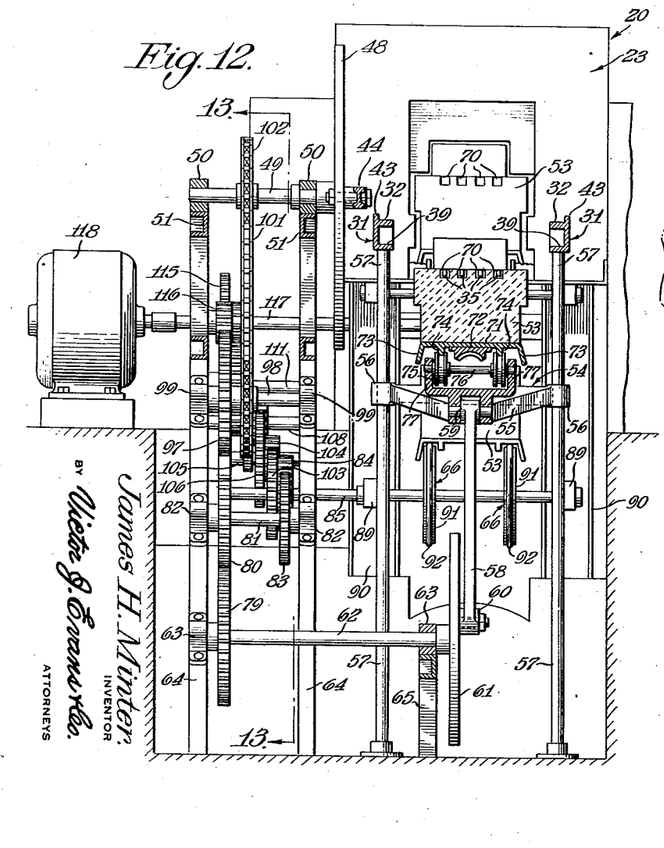
Figure 12 is a view taken substantially from the position indicated by line 12—12 of Figure 10.

Reciprocatory motion is imparted to the elevator 54 through the medium of a rod 58 having one end pivotally connected at 59 with the frame 55 and its other end pivotally connected at 60 with a wheel 61, see Figs. 9 and 12, which wheel is fixed to a shaft 62 rotatably supported in bearings 63, one of which is mounted on the member 64 of one of the frames 51 and the other of which is mounted on a frame 65. Elevator 54 is also reciprocated with an intermittent motion definitely timed or synchronized to the intermittent reciprocatory motion of the carriage 29.

Elevator 54 receives successive pallets from an endless conveyor 66 which travels to move the pallets in the direction of the elevator. In the lowermost position of the elevator 54, the pallets may transfer from the conveyor onto the elevator. Fig. 9 illustrates the elevator 54 raised substantially half its travel upwardly for engagement with the bricks in the position 36. As the bricks in the position 36 are transferred onto the pallet 53, the elevator remains at rest and the carriage 29 is advanced to deposit another series of bricks in the position 36. Such advancement of the carriage brings its tapered rib 134 into the similarly shaped notch 68 in the pallet 53 for pushing the pallet onto the series of wheels 69 which carry the pallets through the kiln. The endless conveyor 66 also extends the full length of the kiln for returning pallets from which the bricks have been removed.

Fig. 12 illustrates the pallet 53 as being provided with a series of grooves 70 for the reception of the load supporting bars 35 when the pallet is in its uppermost position. The pallet also includes a sheet metal base 71 having a rack 72 secured thereto. The two side margins of the base 71 are bent downwardly to provide aprons 73, and the base is provided with two parallel and depending guide rails 74 which are receivable in grooved wheels 75 carried by axles 76 supported by flanges 77 extending upwardly from the frame 55. Wheels 75 are closely spaced, as in Fig. 9, and support the load of the pallet 53. Precise positioning of the pallet 53 on the elevator 54 is secured through the medium of a lug 78 on one of the flanges 77 to stop further movement of the pallet as it moves from the endless belt 66 onto the wheels 75.

Figure 13:
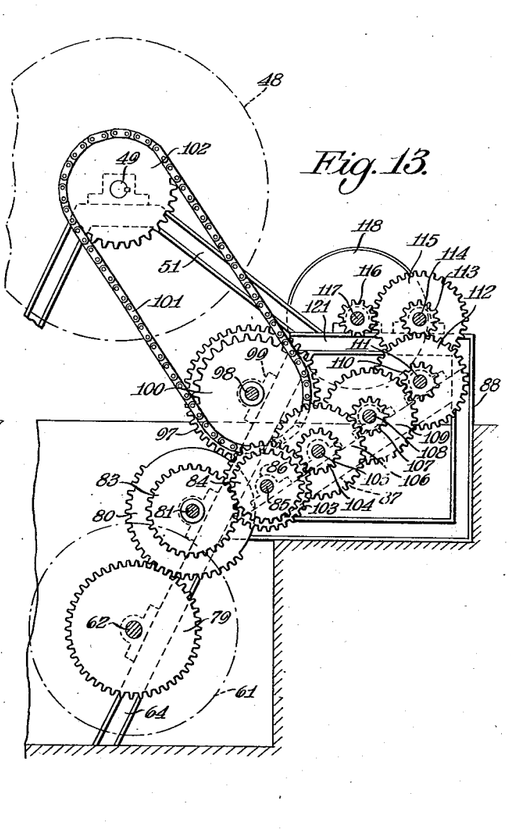
Figure 13 is a view taken from the position indicated by line 13—13 of Figure 12.

Fig. 13 illustrates a gear 79 fixed to the shaft 62 to which the wheel 61 is keyed, which gear is in mesh with a segmental gear 80 keyed to a shaft 81 rotatably carried in bearings 82 on the frames 51. To the shaft 81 is keyed a gear 83 meshing with a gear 84 keyed to a shaft 85 which is rotatably supported in a bearing 86 mounted on a channel 87 in a frame 88. Two frames 88 are provided, to which are secured the members 64 and the frames 51. Shaft 85 is additionally supported by bearings 89, see Fig. 12, secured to upright channels 90. The channels 90 terminate flush with the end of the first unit 23 in the kiln section 20.

The conveyor 66 comprises pairs of grooved wheels 91 which carry cables 92 on which the pallets 53 rest as they are carried to the elevator 54. The first pair of grooved wheels 91 are secured to the shaft 85, which wheels constitute drivers for the cables 92. The remaining pairs of wheels 91 are carried on shafts 93 supported in bearings 94 mounted on channels 95 located inside the tunnel 96 extending lengthwise through all the units 23, 24 and 25 of the sections 20, 21 and 22, respectively.

While the shaft 85 rotates continuously during operation of the kiln, intermittent rotation is imparted to the gear 79 by reason of the segmental gear 80. Segmental gear 80 is arranged for coaction with the gear 97 keyed to a shaft 98 rotatably supported in bearings 99 secured to the channel 64. A sprocket 100 is keyed to the shaft 98 for driving a chain 101 passing around a sprocket 102 keyed to the shaft 49 to which the wheel 48 is attached. The axis of the shaft 81, see Fig. 13, is located in a common plane with the axes of the shafts 62 and 98, so that the gear 97 is located diametrically opposite the gear 79 with respect to the segmental gear 80. During one-half revolution of the segmental gear 80, the gear 97 is under rotation and the gear 79 stationary. During the other half revolution of the segmental gear 80, the gear 79 is under rotation and the gear 97 stationary. Thus the wheel 98 which actuates the carriage 29 is active during the idle period of the elevator 54 and inactive during the ascending and descending periods of the elevator.

A gear 103 is fixed to the shaft 85 and meshes with a pinion 104 keyed to a shaft 105 to which a gear 106 is secured. Gear 106 meshes with a pinion 107 keyed to a shaft 108 which has a gear 109 attached thereto. Gear 109 meshes with a pinion 110 secured to a shaft 111 to which a gear 112 is secured. Gear 112 meshes with a pinion 113 keyed to a shaft 114 which has a gear 115 secured thereto and meshing with a pinion 116 secured to a shaft 117 driven by a motor 118. Shafts 105, 108 and 111 are rotatably supported in bearings 119 mounted on the channels 87 of the frames 88, while the shafts 114 and 117 are rotatably supported in bearings 120 mounted on the horizontal members 121 of the frames 88.

In Fig. 9, the shaft 117 is provided with a worm 122 meshing with a worm gear 123 keyed to a shaft 124 rotatably supported in a bearing 125 mounted on a channel 126 extending through one wall of the unit 23 and secured to one of the frames 88. Fig. 10 illustrates the shaft 117 as being supported adjacent the worm gear 123 by a bearing 127 secured to the channel 126, and the shaft 124 is connected with a short shaft 128 by a universal joint 129, which short shaft is connected with a screw or worm 130 through the medium of a universal joint 131. Screw 130 is rotatably supported in bearings 132 mounted on I-beams 133 secured to the wall structure of the first unit 23 in the section 20. The screw 130 extends longitudinally of the tunnel 96 and is preferably of a length equal to the total length of four pallets 53. This screw acts on the racks 72 of the pallets for advancing the latter through the sections 20, 21 and 22.

In their passage through the sections 20, 21 and 22, the pallets abut end to end one with another and the screw 130, which supplies the power for moving the loaded pallets, rotates at such speed with respect to the respective lengths of the sections 20, 21 and 22 as to provide the necessary time for these sections to perform their respective functions. All the pallets are identical in construction and each includes a transverse V-shaped rib 134 at its leading end which is receivable in the similarly shaped groove 68 in the other end of the next pallet in advance thereof. While the ribs fit in the grooves 68, the abutting ends of the pallets are in actual contact and the ribs 134 are so fitted in the grooves 68 as to restrain the pallets from relative vertical movement as they are advanced on the wheels 69. Thus the column of pallets advancing through the kiln is of a sturdy nature in that the pallets are restrained from lateral excursions by reason of the guide rails 74 fitting in the grooved wheels 69 and the pallets are restrained from relative vertical excursions as they are transferred from wheel to wheel by reason of the interfitting relationship between the ribs and the grooves. While the pallets would shift vertically relatively small distances in the absence of the ribs and grooves, the stabilizing function of this feature is such as to eliminate all unnecessary motions of the pallets which might disarrange the bricks thereon.

Figure 5:
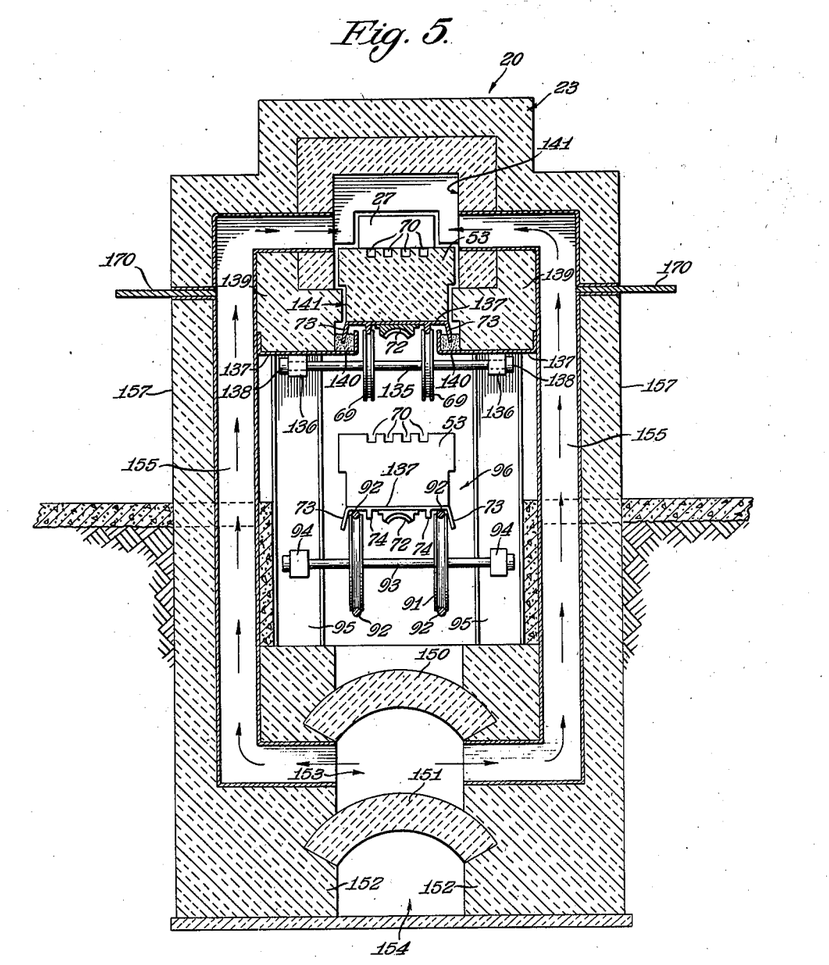
Figure 5 is an enlarged sectional view along the line 5—5 of Figure 2.

Wheels 69 are secured to shafts 135, as in Fig. 5, rotatably carried in bearings 136 secured to channels 137 supported by the upright channels 95 inside the tunnel 96 of all the units 23, 24 and 25. The shafts are restrained from relative longitudinal movement by reason of collars 138.

Fig. 5 illustrates the channels 137 in the unit 23 as being extended inwardly beyond the structural members 139 to provide sand troughs 140 in which the aprons 73 run so that a tunnel 141 is provided in the unit above the tunnel 96. The channels 137 of all the sections 23, 24 and 25 are similarly fashioned. Accordingly, the pallets 53 are returned by the conveyor 66 through the tunnel 96 and the pallets are moved through the tunnel 141 in the opposite direction and on the wheels 69. Since the base plates 137 of the loaded pallets define the bottom wall of the tunnel 141, the pallets do not lie wholly inside this tunnel but the bricks carried on the respective pallets are located wholly inside the tunnel and subjected to the temperature conditions prevailing in the respective sections 20, 21 and 22.

Figure 3:
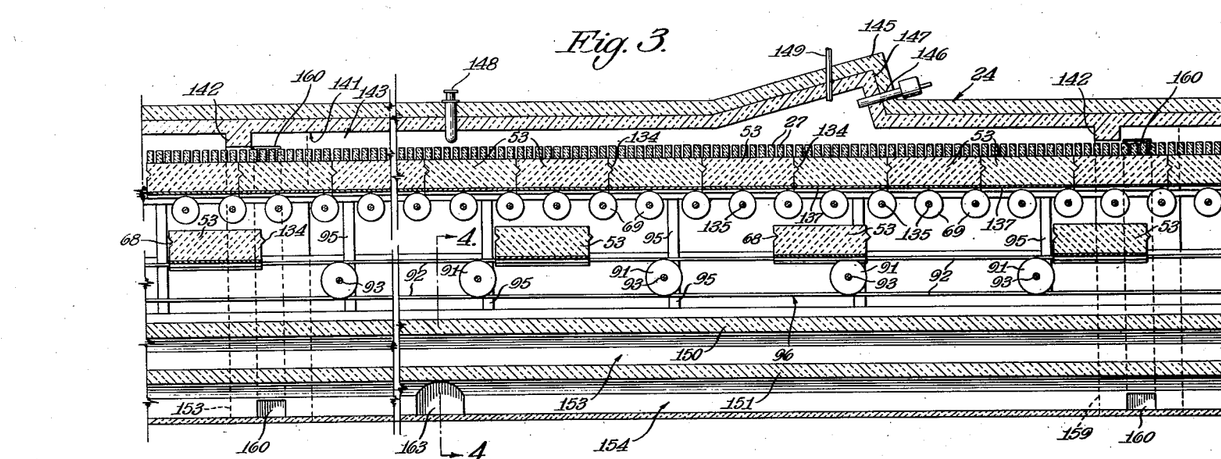
Figure 3 is a vertical sectional view through a portion of the burning or baking section.
Figure 6:
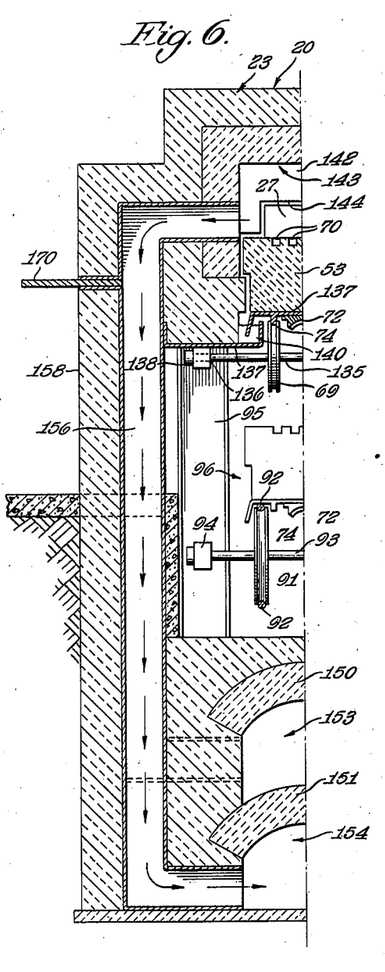
Figure 6 is an enlarged sectional view along the line 6—6 of Figure 2.
Figure 7:
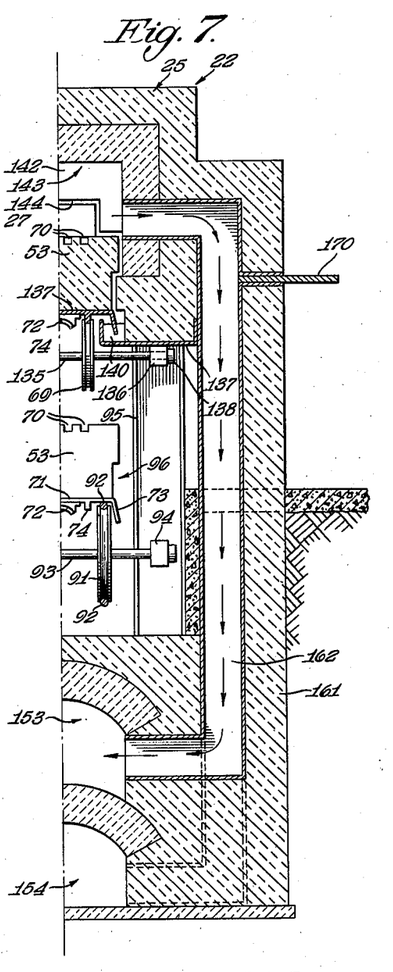
Figure 7 is a sectional view taken along the line indicated by line 7—7 of Figure 2b.

Fig. 3 illustrates one of the units 24 of the burning section 21, which unit is provided with a partition 142 near one end. Each of the units 24 is provided with a similar partition, which is also true of the units 23 and 25 in the sections 20 and 22, respectively, so that the tunnel 141 is divided transversely into a series of chambers 143. Figs. 5, 6 and 7 best illustrate the contour of the partitions 142, which partitions terminate close to the upper faces of the pallets 53 and are cut out at 144 to provide clearance for the bricks a similar partition, which is also true of the units 23 and 25 in the sections 20 and 22, respectively, so that the tunnel 141 is divided transversely into a series of chambers 143. Figs. 5, 6 and 7 best illustrate the contour of the partitions 142, which partitions terminate close to the upper faces of the pallets 53 and are cut out at 144 to providence clearance for the bricks 27 resting edgewise on the respective pallets. The cutouts 144 provide the necessary clearance for the brick but divide the tunnel 141 into suitable chambers 143. All the units 23, 24 and 25 are identically constructed in this connection.

The unit 24 of Fig. 3 is provided with an elevation 145 in its roof. A burner 146 extends through the wall 147 of the elevation for communication with the chamber 143. Each of the units 24 is provided with at least one burner 146. Fig. 1a illustrates five of the units as being each provided with two burners 146, the remaining three units being each provided with one burner only. A pyrometer 148 is provided for each of the units 24, and each unit is also provided with a pipe 149 for the admission of steam.

Arches 150 and 151 are vertically spaced and anchored to the walls 152 of all the units 23, 24 and 25 to provide tunnels 153 and 154 extending throughout the length of the kiln. Each of the units 23 is provided with two passages 155 placing the tunnel 141 in communication with the tunnel 153, as illustrated in Fig. 5, with the two passages 155 illustrated therein located on opposite sides of the unit. Each of the sections 23 is also provided with two passages 156 which place the tunnel 141 in communication with the tunnel 154. Fig. 6 illustrates one of the passages 156 and the second passage of this unit is identically placed and constructed with the one shown. The passages 155 are located at one end of their respective unit 23 and the passages 156 are located at the opposite end of that unit. The side walls of the units 23 are widened to provide accommodation for the passages 155 and 156, as respectively indicated at 157 and 158 in Figs. 1 and 2.

Each of the units 24 of the section 21 is provided with two widening formations 159 located on opposite sides of the unit near one end thereof, each of which is provided with a passage 160 which places the chamber 143 of the unit in communication with the tunnel 154, best illustrated in Fig. 3. Similarly, each unit 25 in the section 22, with the exception of the last unit in the section, is provided with four widening formations 161, two on a side, and the last unit having two such formations, one on a side. Each widening formation 161 is provided with a passage 162, as illustrated in Fig. 7, which places the chamber 143 of its respective unit in communication with the tunnel 153.

Figure 4:
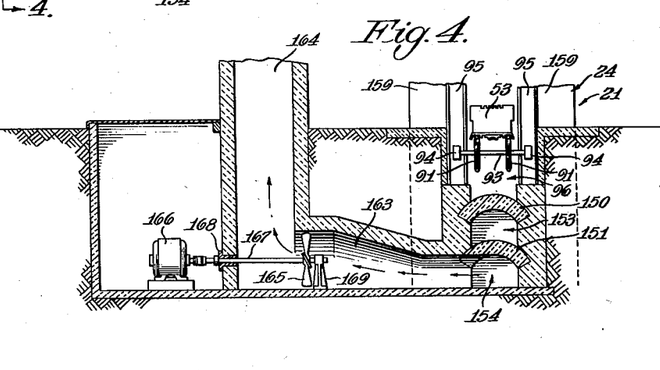
Figure 4 is an enlarged sectional view along the line 4—4 of Figure 3.

One of the units 24 in the section 21 is provided with a laterally extending flue 163, see Fig. 4, which places the tunnel 154 in communication with a chimney 164. An exhaust fan 165 is located in the flue 163 and is driven by a motor 166 through the medium of a shaft 167 supported by a bearing 168 in one wall of the chimney 164 and by a bearing 169 located in the flue 163.

In operation, the hot gases in the chambers 143 of the units 24 are drawn downwardly of the passages 160, into the tunnel 154 and are exhausted to the atmosphere by way of the flue 163 and the chimney 164. Heated air from the chambers 143 of the units 25 in the section 22 is drawn into the tunnel 153 by way of the passages 162. Such air, heated through radiation from the hot brick and wall structure of the units 25, moves in the direction of the brick machine or extruder 26, which is reversely of the travel of the brick through the kiln, and passes into the chambers 143 of the units 23 of the section 20 by way of the passages 155 and then from the chambers by way of the passages 156 and to the tunnel 154 from which it is exhausted by way of the flue 163. The passages 155 are located at one end of the units 23 and the passages 156 at the opposite end, so that the warm air entering the chambers 143 of the units 23 will be caused to travel the full lengths of the units so as to effectively dry the brick before they are introduced into the units of the burning section of the kiln.

All the widening formations 157, 158, 159 and 161 are provided with dampers 170 which may be adjusted to control the temperature conditions of the respective chambers 143. In addition to the pyrometers 148, hydrometers may also be provided wherever necessary.

Figure 8:
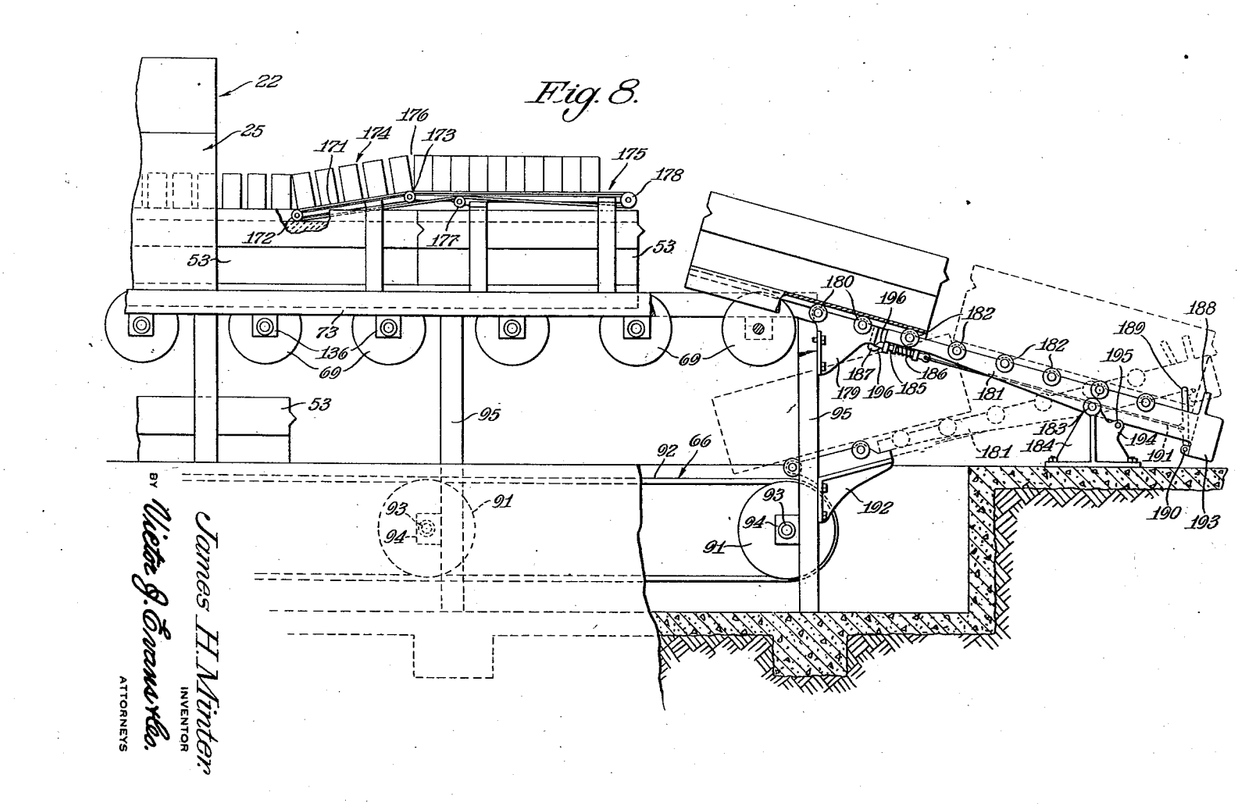
Figure 8 is an elevational view illustrating the discharge end of the kiln and the manner in which the pallets are transferred onto the return conveyor for reloading purposes.

Fig. 8 illustrates the manner in which the brick on the pallets are delivered at the end of the kiln for removal therefrom. The brick are brought onto wire conveyors 171 which are guided on rollers 172 extending into the grooves 70 in the pallets 53 so that the brick thereon will ride onto the endless wires. These wires are supported by rollers 173 intermediate their ends to provide the inclined run 174. Thus the brick on the horizontal and final run 175 are separated, as at 176, from the brick on the incline so that an appropriate tool may be clamped on the ends of the brick group to remove the latter from the conveyor. Tensioning rollers 177 engage the bottom runs of the wires 171 and these wires pass about the end rollers 178 which are power driven by any suitable means not shown.

As the brick are removed from the pallets, the pallets drop downwardly at their forward ends as they pass over the last pair of wheels 69 and fall onto a bracket 179 bolted to two of the channels 95. These brackets are provided with wheels 180 which facilitates gravitation of the pallets onto an inclined frame 181 also having rollers 182 to facilitate travel of the pallets on the frame. Frame 181 is pivoted intermediate its ends on a shaft 183, supported by bearings 184, only one of which is illustrated.

Frame 181 is provided with a latch bolt 185 urged by a spring 186 to overlie a hook 187 supported from the brackets 179. The length of that portion of the frame 181 between the brackets 179 and the shaft 183 is somewhat greater than the length of that portion extending rearwardly beyond the shaft 183. An abutment 188 is provided at the rear end of the frame 181 to act as a stop for the pallets. Adjacent the abutment 188 is positioned a lever 189 which has its lower end pivotally connected at 190 with the frame. A link 191 connects the lever 189 with the latch bolt 185, and the spring 186 normally urges the latch bolt to its position of Fig. 8, at which time the lever 189 is positioned a short distance advancedly of the abutment 188.

Movement of a pallet downwardly of the frame 181 brings the pallet into engagement with the lever 189 for retracting the latch bolt 185 from holding engagement with the hook 187. The frame 181 is weighted at 193 so as to pivot to the full line position of Fig. 8 to permit the latch bolt 185 to pass over the hook 187. The bearings 184 are provided with brackets 194 which support a shaft 195 constituting a stop for the frame 181. The hook 187 as well as the latch bolt 185 are rounded at 196 to cause the latch bolt to be cammed axially when passing beyond the hook.

Abutment 188 is so located as to stop the pallets in a position on the frame 181 which loads the forward end of the frame in a degree which overbalances its weighted rear end. Thus the frame 181 is caused to pivot downwardly by the overbalancing weight of the pallet thereon. The frame moves back to its original position as soon as the pallet is transferred onto the conveyor 66. Thus the pallets are employed for actuating the latch bolt 185 in addition to constituting a loading means which imparts pivotal motion to the frame.

The conveyor 66 travels at about three times the speed of the loaded pallets 53 and the momentum of the unloaded pallets is sufficient to make the transfer from the conveyor onto the elevator 54, with the stop 78 assuring precise positioning of the pallets. Because of the close spacing between the delivery end of the conveyor 66 and the elevator 54, the pallets are positively transferred substantially to their final positions on the elevators, but the momentum carries the pallets the latter part of their travel.

The kiln in the present case embodies an elevator 54 which brings the successive pallets into load carrying engagement with the bricks in such manner as to maintain the orderly arrangement of the bricks. The action of the elevator with respect to the load carrying bars 35 is such as to operate efficiently and with a high degree of speed for transferring the bricks from the bars onto the pallets. The pallets first pass through the section 20 which derives heat for drying purposes from the cooling section 22 through the medium of a subterranean tunnel and branch passages which connect the tunnel with the chambers 143 of the drying units. Moisture may be added through the medium of the pipes 149 in desired amounts to aid in drying the ware without checking or fracturing the same. The loaded pallets are propelled through the medium of the screw 130 which is located outside the burning sections but the pallets move easily by reason of the wheels 69 which carry the loaded pallets. Heat in the section 21 is derived through the medium of burners, which may use natural gas or fuel oil, located along the top of the kiln and spaced at the most advantageous intervals with the burnt products of combustion exiting from the units through the medium of passages connecting the lowermost tunnel of the kiln, these passages being damper controlled for the purpose of heat regulation.

Having thus described certain embodiments of my invention in detail, it is, of course, understood that I do not desire to limit the scope thereof to the exact details set forth except insofar as those details may be defined in the appended claims.

I claim:

1. A kiln having a track for ware laden pallets, a mover means acting on the ware laden pallets on the receiving end of said track advancing the pallets in end to end engagement on said track, a return conveyor for unloaded pallets, a power drive connected with said mover means and said return conveyor, a pallet actuated device for transferring unloaded pallets from the delivery end of said track onto the receiving end of said return conveyor, a ware support located at the receiving end of said track, an elevator located underneath said ware support at the delivery end of said conveyor for receiving pallets from the conveyor one at a time and movable vertically with a pallet thereon for lifting the ware off said support, pusher means for transferring the ware laden pallet from the elevator onto the receiving end of said track, and operating connections between said power drive and said elevator and said pusher means for actuating the elevator and the pusher means in timed sequence.

2. A kiln having a track for ware laden pallets, a screw means acting on the ware laden pallets on the receiving end of said track for advancing the pallets in end to end engagement on said track, a return conveyor for unloaded pallets, a power drive connected with said screw means and said return conveyor, a pallet actuated device for transferring unloaded pallets from the delivery end of said track onto the receiving end of said return conveyor, a ware support located at the receiving end of said track, an elevator located underneath said ware support at the delivery end of said conveyor for receiving pallets from the conveyor one at a time and movable vertically with a pallet thereon for lifting the ware off said support, pusher means for transferring the ware laden pallet from the elevator onto the receiving end of said track, and operating connections between said power drive and said elevator and said pusher means for actuating the elevator and the pusher means in timed sequence.

3. A kiln having a track for ware laden pallets, a mover means acting on the ware laden pallets on the receiving end of said track for advancing the pallets in end to end engagement on said track, a return conveyor for unloaded pallets, a power drive connected with said mover means and said return conveyor, a pallet actuated device for transferring unloaded pallets from the delivery end of said track onto the receiving end of said return conveyor, a ware support located at the receiving end of said track, an elevator located underneath said ware support at the delivery end of said conveyor for receiving pallets from the conveyor one at a time and movable vertically with a pallet thereon for lifting the ware off said support, pusher means for transferring the ware laden pallet from the elevator onto the receiving end of said track, and a gear train operatively connecting said power drive and said elevator and said pusher means, said gear train including a segmental gear for actuating said elevator and said pusher means in timed sequence.

4. A kiln having a track for ware laden pallets, a mover means acting on the ware laden pallets on the receiving end of said track for advancing the pallets in end to end engagement on said track, a return conveyor for unloaded pallets, a power drive connected with said mover means and said return conveyor, a pallet actuated device for transferring unloaded pallets from the delivery end of said track onto the receiving end of said return conveyor, spaced bars for supporting ware at the receiving end of said track, an elevator located underneath said bars at the delivery end of said conveyor for receiving pallets from the conveyor one at a time and movable vertically with a pallet thereon for lifting the ware off said support, said pallets having grooves in their ware supporting faces for receiving said bars to bring the ware into supported engagement with the pallets, pusher means for transferring the ware laden pallets from the elevator onto the receiving end of said track, and operating connections between said power drive and said elevator and said pusher means for actuating the elevator and the pusher means in timed sequence.

5. A kiln having a track for ware laden pallets, a mover means acting on the ware laden pallets on the receiving end of said track for advancing the pallets in end to end engagement on said track, a return conveyor for unloaded pallets, a power drive connected with said mover means and said return conveyor, a pallet actuated device for transferring unloaded pallets from the delivery end of said track onto the receiving end of said return conveyor, a ware support located at the receiving end of said track, an elevator located underneath said ware support at the delivery end of said conveyor for receiving pallets from the conveyor one at a time and movable vertically with a pallet thereon for lifting the ware off said support, pusher means for transferring the ware laden pallet from the elevator onto the receiving end of said track, operating connections between said power drive and said elevator and said pusher means for actuating the elevator and the pusher means in timed sequence, a carriage for moving ware from an extruder to a position above said ware support, means for guiding the movement of said carriage and dropping the latter when positioned vertically of said ware support to deposit the ware on the ware support, and said pusher means being fixedly secured to said carriage to move the latter in timed sequence with the pusher means.

6. A kiln having a track for ware laden pallets, a screw means acting on the ware laden pallets on the receiving end of said track for advancing the pallets in end to end engagement on said track, a return conveyor for unloaded pallets, a power drive connected with said screw means and said return conveyor, a pallet actuated device for transferring unloaded pallets from the delivery end of said track onto the receiving end of said return conveyor, a ware support located at the receiving end of said track, an elevator located underneath said ware support at the delivery end of said conveyor for receiving pallets from the conveyor one at a time and movable vertically with a pallet thereon for lifting the ware off said support, pusher means for transferring the ware laden pallet from the elevator onto the receiving end of said track, operating connections between said power drive and said elevator and said pusher means for actuating the elevator and the pusher means in timed sequence, a carriage for moving ware from an extruder to a position above said ware support, means for guiding the movement of said carriage and dropping the latter when positioned vertically of said ware support to deposit the ware on the ware support, and said pusher means being fixedly secured to said carriage to move the latter in timed sequence with the pusher means.

7. A kiln having a track for ware laden pallets, a mover means acting on the ware laden pallets on the receiving end of said track for advancing the pallets in end to end engagement on said track, a return conveyor for unloaded pallets, a power drive connected with said mover means and said return conveyor, a pallet actuated device for transferring unloaded pallets from the delivery end of said track onto the receiving end of said return conveyor, a ware support located at the receiving end of said track, an elevator located underneath said ware support at the delivery end of said conveyor for receiving pallets from the conveyor one at a time and movable vertically with a pallet thereon for lifting the ware off said support, pusher means for transferring the ware laden pallet from the elevator onto the receiving end of said track, a gear train operatively connecting said power drive and said elevator and said pusher means, said gear train including a segmental gear for actuating said elevator and said pusher means in timed sequence, a carriage for moving ware from an extruder to a position above said ware support, means for guiding the movement of said carriage and dropping the latter when positioned vertically of said ware support to deposit the ware on the ware support, and said pusher means being fixedly secured to said carriage to move the latter in timed sequence with the pusher means.

8. A kiln having a track for ware laden pallets, a mover means acting on the ware laden pallets on the receiving end of said track for advancing the pallets in end to end engagement on said track, a return conveyor for unloaded pallets, a power drive connected with said mover means and said return conveyor, a pallet actuated device for transferring unloaded pallets from the delivery end of said track onto the receiving end of said return conveyor, spaced bars for supporting ware at the receiving end of said track, an elevator located underneath said bars at the delivery end of said conveyor for receiving pallets from the conveyor one at a time and movable vertically with a pallet thereon for lifting the ware off said support, said pallets having grooves in their ware supporting faces for receiving said bars to bring the ware into supported engagement with the pallets, pusher means for transferring the ware laden pallets from the elevator onto the receiving end of said track, operating connections between said power drive and said elevator and said pusher means for actuating the elevator and the pusher means in timed sequence, a carriage for moving ware from an extruder to a position above said spaced bars, means for guiding the movement of said carriage and dropping the latter when positioned vertically of said spaced bars to deposit the ware on the spaced bars, and said pusher means being fixedly secured to said carriage to move the latter in timed sequence with the pusher means.

9. A kiln having a track for ware laden pallets, a mover means acting on the ware laden pallets on the receiving end of said track for advancing the pallets in end to end engagement on said track, a return conveyor for unloaded pallets, a power drive connected with said mover means and said return conveyor, a pallet actuated device for transferring unloaded pallets from the delivery end of said track onto the receiving end of said return conveyor, a ware support located at the receiving end of said track, an elevator located underneath said ware support at the delivery end of said conveyor for receiving pallets from the conveyor one at a time and movable vertically with a pallet thereon for lifting the ware off said support, pusher means for transferring the ware laden pallet from the elevator onto the receiving end of said track, operating connections between said power drive and said elevator and said pusher means for actuating the elevator and the pusher means in timed sequence, said mover means including racks on the pallets, and a rotary worm meshing with the worms.

10. A kiln having a track for ware laden pallets, a mover means acting on the ware laden pallets on the receiving end of said track for advancing the pallets in end to end engagement on said track, a return conveyor for unloaded pallets, a power drive connected with said mover means and said return conveyor, a pallet actuated device for transferring unloaded pallets from the delivery end of said track onto the receiving end of said return conveyor, a ware support located at the receiving end of said track, an elevator located underneath said ware support at the delivery end of said conveyor for receiving pallets from the conveyor one at a time and movable vertically with a pallet thereon for lifting the ware off said support, pusher means for transferring the ware laden pallet from the elevator onto the receiving end of said track, operating connections between said power drive and said elevator and said pusher means for actuating the elevator and the pusher means in timed sequence, said track comprising pairs of spaced wheels, the pallets having rails guidingly engageable with said wheels, and the pallets having interfitting flange and groove formations restraining relative vertical movement of the pallets during travel on said track.

11. A kiln having a first tunnel, a second tunnel, a third tunnel and a fourth tunnel, pallets, a track for moving ware laden pallets through said fourth tunnel, said pallets and said kiln being provided with means coacting to separate the fourth tunnel from the third tunnel, a conveyor for returning unloaded pallets through the third tunnel, said first and second tunnels being located underneath said third tunnel and the fourth tunnel being located above the third tunnel, said fourth tunnel being divided into a drying zone, a burning zone and a cooling zone, said kiln being provided with passages placing the burning zone of the fourth tunnel in communication with said first tunnel, said kiln being provided with passages placing the cooling zone of the fourth tunnel in communication with the second tunnel and passages placing the second tunnel in communication with the drying zone of the fourth tunnel, said kiln having passages placing the drying zone of the fourth tunnel in communication with the first tunnel, and means for exhausting air and burnt products of combustion from said first tunnel.

12. A kiln having a first tunnel, a second tunnel, a third tunnel and a fourth tunnel, pallets, a track for moving ware laden pallets through said fourth tunnel, said pallets and said kiln being provided with means coacting to separate the fourth tunnel from the third tunnel, a conveyor for returning unloaded pallets through the third tunnel, said fourth tunnel being divided into a drying zone, a burning zone and a cooling zone, said kiln being provided with passages placing the burning zone of the fourth tunnel in communication with said first tunnel, said kiln being provided with passages placing the cooling zone of the fourth tunnel in communication with the second tunnel and passages placing the second tunnel in communication with the drying zone of the fourth tunnel, said kiln having passages placing the drying zone of the fourth tunnel in communication with the first tunnel, and means for exhausting air and burnt products of combustion from said first tunnel.

13. A kiln having a first tunnel, a second tunnel, a third tunnel and a fourth tunnel, pallets, a track for moving ware laden pallets through said fourth tunnel, said pallets and said kiln being provided with means coacting to separate the fourth tunnel from the third tunnel, a conveyor for returning unloaded pallets through the third tunnel, said fourth tunnel being divided into a plurality of drying zones, a plurality of burning zones and a plurality of cooling zones, said kiln being provided with passages placing the plurality of burning zones in communication with said first tunnel, said kiln being provided with passages placing said plurality of cooling zones in communication with the second tunnel and passages placing the second tunnel in communication with said plurality of drying zones, said kiln having passages placing the plurality of drying zones in communication with said first tunnel, and means for exhausting air and burnt products of combustion from said first tunnel.

14. In a kiln of the type described, a first conveyor for loaded pallets, a second conveyor for unloaded pallets located underneath the first conveyor, a pivoted gravity conveyor at the delivery and receiving ends of the first and second conveyors, respectively, said gravity conveyor being balanced to receive unloaded pallets from the first conveyor, a latch device for holding the gravity conveyor in its pallet receiving position with respect to the first conveyor, pallet engageable actuator for said latch for unlatching the latter when engaged by a pallet moving down the gravity conveyor, said gravity conveyor being so pivoted and balanced as to pivot downwardly for delivering a pallet thereon onto said second conveyor and then pivoting to its latched position with respect to said first conveyor.

JAMES H. MINTER.